United States Patent
Schumacher et al.

(10) Patent No.: US 10,336,274 B2
(45) Date of Patent: Jul. 2, 2019

(54) CONTROL UNIT FOR A RESTRAINT SYSTEM IN A VEHICLE

(71) Applicant: Robert Bosch GmbH, Stuttgart (DE)

(72) Inventors: Hartmut Schumacher, Freiberg (DE); Leonardo Kovacic, Vaihingen Enz (DE); Rainer Gschwind-Schilling, Rutesheim (DE); Ruediger Karner, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 160 days.

(21) Appl. No.: 15/311,731

(22) PCT Filed: Jun. 1, 2015

(86) PCT No.: PCT/EP2015/062068
§ 371 (c)(1),
(2) Date: Nov. 16, 2016

(87) PCT Pub. No.: WO2015/185473
PCT Pub. Date: Dec. 10, 2015

(65) Prior Publication Data
US 2017/0088079 A1 Mar. 30, 2017

(30) Foreign Application Priority Data
Jun. 5, 2014 (DE) .................. 10 2014 210 815

(51) Int. Cl.
*B60R 21/017* (2006.01)
*B60R 21/01* (2006.01)
(52) U.S. Cl.
CPC . *B60R 21/0173* (2013.01); *B60R 2021/01129* (2013.01); *B60R 2021/01136* (2013.01); *B60R 2021/01184* (2013.01)

(58) Field of Classification Search
CPC ....... B60R 21/0173; B60R 2021/01129; B60R 2021/01136; B60R 2021/01184
See application file for complete search history.

(56) References Cited

U.S. PATENT DOCUMENTS

| 5,122,954 | A | 6/1992 | Okano |
| 5,506,509 | A | 4/1996 | Susak |
| 6,332,399 | B1* | 12/2001 | Laucht ................ B60R 21/017 102/202.5 |

FOREIGN PATENT DOCUMENTS

| DE | 4432301 A1 | 3/1996 |
| JP | 20011347918 A | 12/2001 |

(Continued)

OTHER PUBLICATIONS

International Search Report dated Aug. 19, 2015, of the corresponding International Application PCT/EP2015/062068 filed Jun. 1, 2015.

*Primary Examiner* — Jerrah Edwards
(74) *Attorney, Agent, or Firm* — Norton Rose Fulbright US LLP; Gerard Messina

(57) ABSTRACT

A control unit for a restraint system in a vehicle, including an evaluation and control unit and at least one external ignition circuit interface to which a squib for activating the restraint system is connected via a go-line and a return line, the evaluation and control unit cyclically ascertaining, by measuring, an instantaneous ohmic loop resistance of the corresponding ignition circuit and comparing this with at least one stored threshold value. The evaluation and control unit determines an instantaneous temperature in the vehicle interior, close to the time for the measured value detection for ascertaining the ignition circuit loop resistance, the evaluation and control unit carrying out a temperature compensation of the ascertained ignition circuit loop resistance for the go-line and return line of the connected ignition (Continued)

circuit based on the instantaneous temperature in the vehicle interior, the go-line and return line being situated outside the control unit.

10 Claims, 2 Drawing Sheets

(56) References Cited

FOREIGN PATENT DOCUMENTS

| | | |
|---|---|---|
| WO | 9609191 A1 | 3/1996 |
| WO | 9836285 A1 | 8/1998 |

* cited by examiner

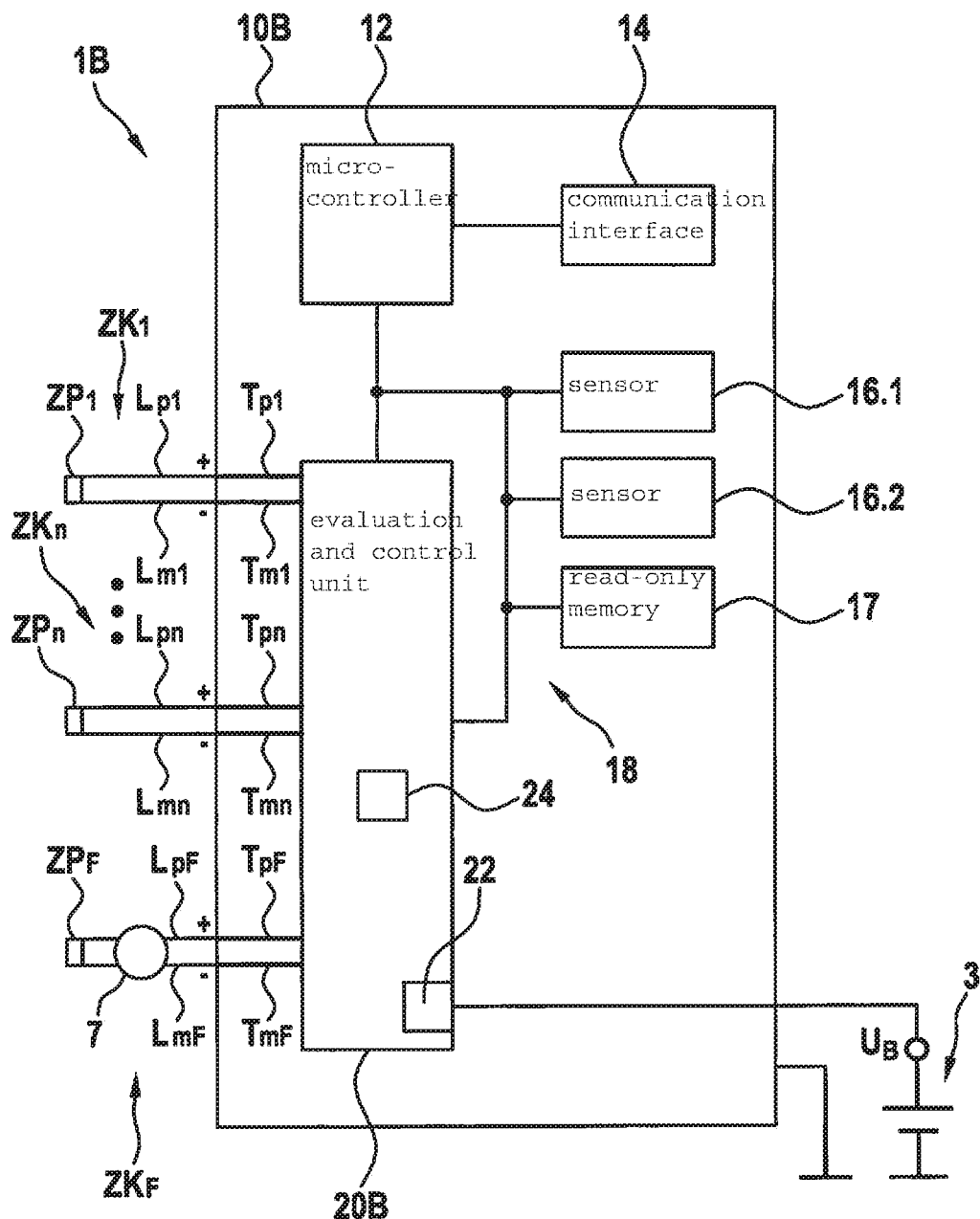

CONTROL UNIT FOR A RESTRAINT SYSTEM IN A VEHICLE

FIELD

The present invention is directed to a control unit for a restraint system in a vehicle.

BACKGROUND INFORMATION

For the reliable monitoring of ignition circuits for restraint systems in a vehicle, the loop resistance of the ignition circuit is cyclically measured and compared with upper and lower limiting values. If one of the limiting values is exceeded or fallen below, a faulty state in the ignition circuit is detected. Generally, the activation of the airbag warning light takes place only when this faulty state is not the product of a one-time error, but rather is confirmed after suitable filtering.

A circuit for controlling and monitoring ignition circuits in safety devices, such as, for example, restraint systems in motor vehicles, is described in German Patent No. DE 44 32 301 B4. A squib, which is actuatable by an output stage and to which a test current may be applied for continuity testing, is provided in the ignition circuits.

SUMMARY

The control unit according to the present invention for a restraint system in a vehicle may have the advantage over the related art that, due to the determination and utilization of the interior temperature of the vehicle and, optionally, the internal temperature of the control unit, the massive influence of the temperature on the temperature-dependent resistance of the feeds to the squibs may be compensated for.

In addition, specific embodiments of the control unit according to the present invention make it possible to use smaller copper core cross sections in the ignition circuit without sacrificing monitoring accuracy and expansion of the limiting values. In this way, instead of the 0.5 $mm^2$ stranded copper wires used nowadays as connection wires, smaller cross sections of, for example, 0.35 $mm^2$ may be used in the future. This advantageously allows for a weight reduction.

Specific embodiments of the present invention provide a control unit for a restraint system in a vehicle including an evaluation and control unit and at least one external ignition circuit interface, to which a squib for activating the restraint system is connected via a go-and-return line. The evaluation and control unit cyclically ascertains, by measuring, an instantaneous ohmic loop resistance of the corresponding ignition circuit and compares this with at least one stored threshold value. According to the present invention, the evaluation and control unit determines an instantaneous temperature in the vehicle interior, close to the time for the measured value detection for ascertaining the ignition circuit loop resistance, the evaluation and control unit carrying out a temperature compensation of the ascertained ignition circuit loop resistance for the go-and-return line of the connected ignition circuit on the basis of the instantaneous temperature in the vehicle interior, the go-and-return line being situated outside the control unit.

Due to the measures and refinements described herein, advantageous improvements on the control unit for a restraint system in a vehicle are possible.

It is particularly advantageous that the evaluation and control unit reads in the instantaneous temperature in the vehicle interior from a temperature sensor via a communication interface. This advantageously allows for a simple and rapid temperature compensation.

In one advantageous embodiment of the control unit according to the present invention, the evaluation and control unit may determine an instantaneous internal temperature in the control unit, where the evaluation and control unit may carry out, on the basis of the instantaneous internal temperature in the control unit, a temperature compensation of the ascertained ignition circuit loop resistance for a first conductor which is situated within the control unit and connects the evaluation and control unit to the go-line, and a second conductor which is situated within the control unit and connects the evaluation and control unit to the return line. This advantageously allows for the temperature compensation of the entire feed between the evaluation and control unit and the squib.

In one further advantageous embodiment of the control unit according to the present invention, the evaluation and control unit may detect an instantaneous supply voltage via an analog-digital converter. On the basis of the instantaneous supply voltage, the evaluation and control unit may determine power losses of components situated within a housing of the control unit. In addition, the evaluation and control unit may calculate the instantaneous internal temperature in the control unit on the basis of the instantaneous temperature in the vehicle interior and the ascertained power losses and a thermal resistance of the control unit housing.

In one further advantageous embodiment of the control unit according to the present invention, a temperature sensor may be situated within the evaluation and control unit, which detects an internal contact temperature within the evaluation and control unit. The evaluation and control unit may advantageously calculate the instantaneous internal temperature in the control unit on the basis of the internal contact temperature and the power loss of the evaluation and control unit and a thermal resistance between the internal contact of the evaluation and control unit and the interior of the control unit. In addition, the evaluation and control unit may calculate the instantaneous temperature in the vehicle interior on the basis of the instantaneous internal temperature in the control unit and the ascertained power losses in the control unit and a thermal resistance of the control unit housing, so that a temperature sensor in the vehicle interior may be dispensed with.

In one further advantageous embodiment of the control unit according to the present invention, parameters and/or parameter curves and/or parameter tables may be stored in a read-only memory. These may be advantageously utilized in the temperature compensation.

Exemplary embodiments of the present invention are represented in the figures and are described in greater detail below. In the figures, the same reference numerals label components or elements which carry out identical or similar functions.

BRIEF DESCRIPTION OF THE DRAWINGS

FIG. 2 shows a schematic block diagram of an ignition circuit system including a second exemplary embodiment of a control unit according to the present invention for a restraint system in a vehicle.

DETAILED DESCRIPTION OF EXAMPLE EMBODIMENTS

Figure 1:
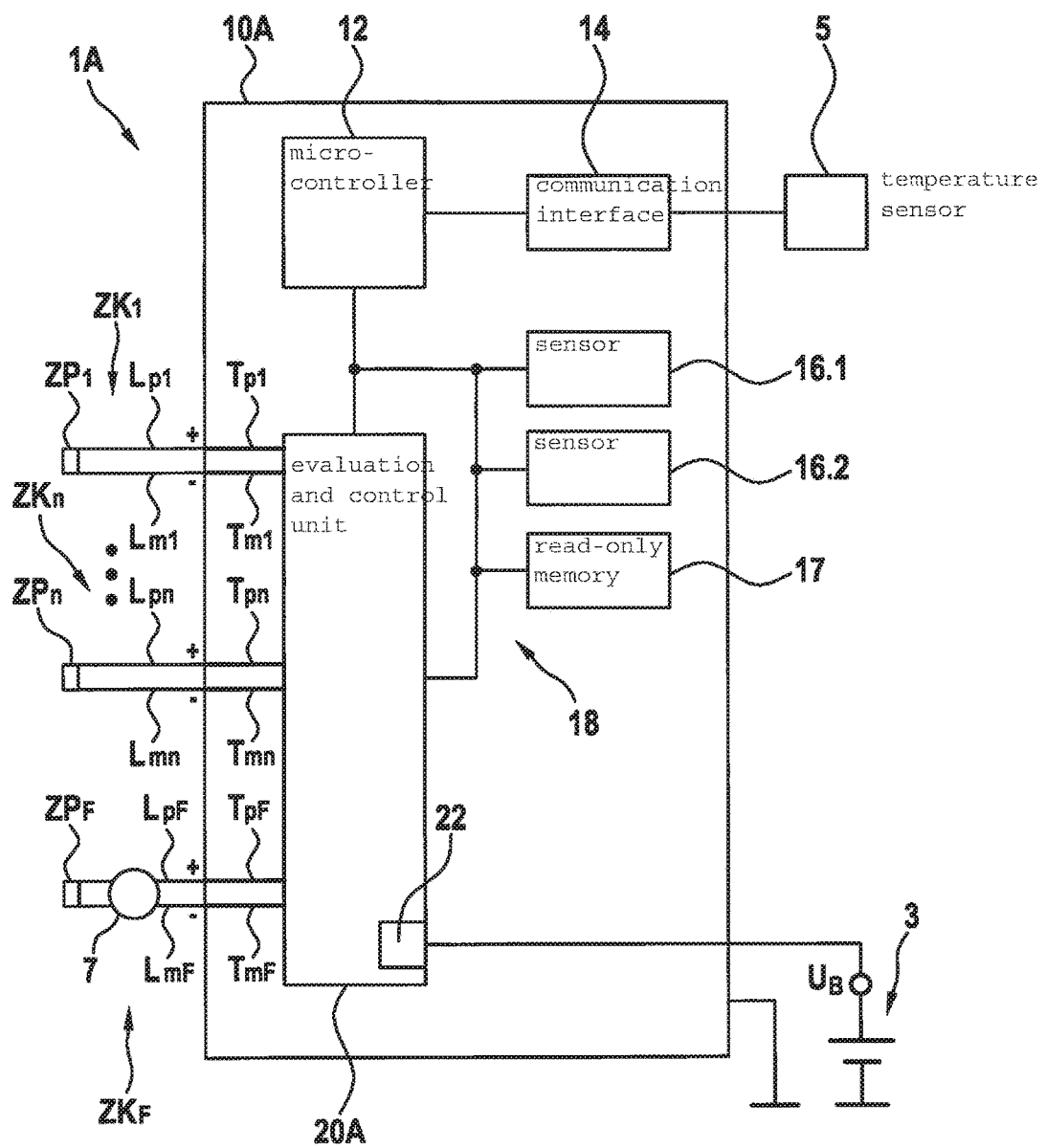
FIG. 1 shows a schematic block diagram of an ignition circuit system including a first exemplary embodiment of a control unit according to the present invention for a restraint system in a vehicle.

As is apparent from FIGS. 1 and 2, the represented exemplary embodiments of a control unit 10A, 10B according to the present invention for a restraint system in a vehicle each include an evaluation and control unit 20A, 20B and at least one external ignition circuit interface to which a squib $ZP_1$, $ZP_n$, $ZP_F$ for activating the restraint system is connected via a go-line $L_{p1}$, $L_{pn}$, $L_{pF}$ and a return line $L_{m1}$, $L_{mn}$, $L_{mF}$. Evaluation and control unit 20A, 20B cyclically ascertains, by measuring, an instantaneous ohmic loop resistance $R_{ZK(i)\_mess}$ of corresponding ignition circuit $ZK_1$, $ZK_n$, $ZK_F$ and compares instantaneous ohmic loop resistance $R_{ZK(i)\_mess}$ with at least one stored threshold value $G_O$, $G_U$. According to the present invention, evaluation and control unit 20A, 20B determines an instantaneous temperature $\vartheta_I$ in the vehicle interior, close to the time for the measured value detection for ascertaining ignition circuit loop resistance $R_{ZK(i)\_mess}$, evaluation and control unit 20A, 20B carrying out a temperature compensation of ascertained ignition circuit loop resistance $R_{ZK(i)\_mess}$ for go-line $L_{p1}$, $L_{pn}$, $L_{pF}$ and return line $L_{m1}$, $L_{mn}$, $L_{mF}$ of connected ignition circuit $ZK_1$, $ZK_n$, $ZK_F$ on the basis of instantaneous temperature $\vartheta_I$ in the vehicle interior, the go-and-return line being situated outside control unit 10A, 10B.

As is further apparent from FIGS. 1 and 2, each of the represented ignition circuit systems 1A, 1B includes a predefined number n of ignition circuits $ZK_1$ through $ZK_n$ for different restraint system situated in the vehicle, such as, for example, rollover bars, headrests, side airbags, passenger airbag, seat belt tighteners, etc., of which two ignition circuits $ZK_1$, $ZK_n$ and one ignition circuit $ZK_F$ for a driver airbag are represented by way of example. Individual ignition circuits $ZK_1$, $ZK_n$, $ZK_F$ are each connected to a control unit 10A, 10B via an ignition circuit interface which includes an ignition circuit positive terminal (+) and an ignition circuit negative terminal (−), each ignition circuit also including a squib $ZP_1$, $ZP_n$, $ZP_F$. Individual squibs $ZP_1$, $ZP_n$, $ZP_F$ are connected to ignition circuit positive terminal (+) of control unit 10A, 10B via a go-line $L_{p1}$, $L_{pn}$, $L_{pF}$, respectively, and to ignition circuit negative terminal (−) of the control unit via a return line $L_{m1}$, $L_{mn}$, $L_{mF}$, respectively. Within control unit 10A, 10B, ignition circuits $ZK_1$, $ZK_n$, $ZK_F$ include a first conductor $T_{p1}$, $T_{p2}$, $T_{pF}$, respectively, which connects evaluation and control unit 20A, 20B to corresponding go-line $L_{p1}$, $L_{pn}$, $L_{pF}$ and to corresponding ignition circuit positive terminal (+), and include a second conductor $T_{m1}$, $T_{m2}$, $T_{mF}$ which connects evaluation and control unit 20A, 20B to corresponding return line $L_{m1}$, $L_{mn}$, $L_{mF}$ and to corresponding ignition circuit terminal (−). Ignition circuit $ZK_F$ for the driver airbag, in contrast to the other ignition circuits $ZK_1$, $ZK_n$, includes a clock spring 7 situated in the steering wheel.

As is further apparent from FIGS. 1 and 2, in the represented exemplary embodiments, particular control unit 10A, 10B includes a microcontroller 12, a communication interface 14, two sensors 16.1, 16.2 for detecting crash-relevant information which is evaluated by microcontroller 12 for generating trigger signals, and a read-only memory 17 which stores parameters and/or parameter curves and/or parameter tables which are used for monitoring ignition circuits $ZK_1$, $ZK_n$, $ZK_F$. In addition, an upper threshold value $G_O$ and a lower threshold value $G_U$ may also be stored in read-only memory 17. In addition, evaluation and control unit 20A, 20B detects, via an analog-digital converter 22, an instantaneous supply voltage $U_B$ of an energy source 3 of control unit 10A, 10B. In addition, control unit 10A, 20A includes a data bus 18, preferably an SPI bus, for internal communication.

Ohmic loop resistance $R_{ZK(i)\_mess}$, which is to be monitored, of an ignition circuit $ZK_1$, $ZK_n$, $ZK_F$ is composed of multiple subcomponents. Ohmic loop resistance $R_{ZK(i)\_mess}$ generally includes bond resistances of the connecting wires of evaluation and control unit 20A, 20B, which is preferably designed as an ASIC (application-specific integrated circuit), contact resistances of the bond connections, soldered joint connections, airbag plug connections, adapter plugs, squib plugs, etc., line resistances of conductors $T_{p1}$, $T_{p2}$, $T_{pF}$, $T_{m1}$, $T_{m2}$, $T_{mF}$ which connect evaluation and control unit 20A, 20B to ignition circuit positive terminals (+) and ignition circuit negative terminals (−) of the external interfaces of control unit 10a, 10B, and ignition circuit go-lines $L_{p1}$, $L_{pn}$, $L_{pF}$ and ignition circuit return lines $L_{m1}$, $L_{mn}$, $L_{mF}$ which connect ignition circuit positive terminals (+) and ignition circuit negative terminals (−) of the external interfaces to corresponding squibs $ZP_1$, $ZP_n$, $ZP_F$, the ohmic resistance of clock spring 7 which is situated in the driver steering wheel, and an ohmic resistance of particular squib $ZP_1$, $ZP_n$, $ZP_F$. The clock spring resistance is present only in ignition circuit $ZK_F$ of the driver airbag.

The limiting value may be predefined individually for each ignition circuit $ZK_1$, $ZK_n$, $ZK_F$ or may be subdivided into three to four groups. In this way, for example, limiting values may be predefined individually for the driver airbag ignition circuit, ignition circuits for other front occupants, ignition circuits for occupants of the rear compartment, special ignition circuits (e.g., battery disconnect), etc. In the represented exemplary embodiments, upper limiting value $G_O$ for ignition circuits $ZK_1$, $ZK_n$ is, for example 6Ω, and lower limiting value $G_U$ is, for example, 1Ω. Upper limiting value $GF_O$ and lower limiting value $GF_U$ for driver airbag ignition circuit $ZK_F$ differ from limiting values $G_O$, $G_U$ of the other ignition circuits $ZK_1$, $ZK_n$ due to clock spring 7. In the represented exemplary embodiments, for example, upper limiting value $GF_O$ for driver airbag ignition circuit $ZK_F$ is, for example, 6.5Ω, and lower limiting value $GF_U$ is, for example, 1.5Ω.

Ohmic resistance $R_{ZKe}$, which is to be monitored, of individual ignition circuits $ZK_1$, $ZK_n$ outside the control unit is formulated according to equation (1) as follows:

$$R_{ZKe} = R_{Lp} + R_{Lm} + R_K + R_{ZP} \tag{1}$$

Equation (2) applies for ohmic resistance $R_{ZKFe}$ of ignition circuit $ZK_F$ of the driver airbag:

$$R_{ZKFe} + R_{Lp} + R_{Lm} + R_{WF} + R_K + R_{ZP} \tag{2}$$

$R_{ZKe}$: external ignition circuit resistance (outside the control unit)
$R_{ZKFe}$: external driver ignition circuit resistance (outside the control unit)
$R_{Lp}$: copper resistance of all go-lines of the ignition circuit
$R_{Lm}$: copper resistance of all return lines of the ignition circuit
$R_K$: sum of all contact resistances
$R_{ZP}$: squib resistance
$R_{WF}$: copper resistance of the clock spring (go-and-return line)

The physical characteristics of the copper resistance as a function of the temperature are predefined for the common copper alloy E-CU57 (DIN 1787) according to equation (3):

$$R_{Cu}(\vartheta) = R_{Cu}(20° \text{ C.}) + (R_{Cu}(20° \text{ C.}) \times (\vartheta - 20° \text{ C.}) \times \alpha) \tag{3}$$

$R_{Cu(\vartheta)}$: copper resistance as a function of the temperature
$R_{Cu(20° C.)}$: copper resistance at 20° C.
$\vartheta$: temperature of the copper in ° Celsius
$\alpha$: temperature coefficient of the copper resistance=+0.0039/° C.

According to equation (3), when the ambient temperature increases from 20° C. to 85° C., the copper resistance increases by (85° C.−20° C.)×0.0039/° C.=25.35%. When the temperature drops from 20° C. to −40° C., the copper resistance decreases by (−40° C.−20° C.)×0.0039/° C.=23.40%.

For an ignition circuit including a go-and-return line having an overall length "l" and cross section "A" made from copper, the line resistance, according to equation (4), is:

$$R_{L(\vartheta)}=p(20° C.)\times(l/A)\times(1+(\vartheta-20° C.)\times\alpha) \quad (4)$$

$R_{L(\vartheta)}$: line resistance as a function of the temperature
p(20° C.): specific resistance=17.54 mΩ×mm²/m
l: length of the go-and-return line
$\alpha$: temperature coefficient of the copper resistance=+0.0039/° C.
$\vartheta$: temperature of the copper in ° Celsius For a general length of the ignition circuit line of 20 m solid copper wire (10 m go-line $L_{p1}$, $L_{pn}$, $L_{pF}$ and 10 m return line $L_{m1}$, $L_{mn}$, $L_{mF}$), a typical ohmic resistance RL of 702 mΩ at 20° C. and a temperature tolerance of +177 mΩ/−165 mΩ in the vehicle temperature range of −40° C. to 85° C. result when the present standard cross section of 0.5 mm² is implemented.

For the general length of the ignition circuit line of 20 m solid copper wire (10 m go-line $L_{p1}$, $L_{pn}$, $L_{pF}$ and 10 m return line $L_{m1}$, $L_{mn}$, $L_{mF}$), a typical ohmic resistance RL of 1002 mΩ at 20° C. and a temperature tolerance of +254 mΩ/−234 mΩ in the vehicle temperature range of −40° C. to 85° C. result when a future standard cross section of 0.35 mm² is implemented.

Since, generally, the ignition circuit lines are flexible and stranded copper wires are utilized, the stranded wire space factor must also be taken into account. It is approximately 90%.

For the general length of the ignition circuit line of 20 m stranded copper wire (10 m go-line $L_{p1}$, $L_{pn}$, $L_{pF}$ and 10 m return line $L_{m1}$, $L_{mn}$, $L_{mF}$), a typical ohmic resistance RL of 780 mΩ at 20° C. and a temperature tolerance of +197 mΩ/−183 mΩ in the vehicle temperature range of −40° C. to 85° C. result when the present standard cross section of 0.5 mm² is implemented.

For the general length of the ignition circuit line of 20 m stranded copper wire (10 m go-line $L_{p1}$, $L_{pn}$, $L_{pF}$ and 10 m return line $L_{m1}$, $L_{mn}$, $L_{mF}$), a typical ohmic resistance $R_L$ of 1114 mΩ at 20° C. and a temperature tolerance of +282 mΩ/−261 mΩ in the vehicle temperature range of −40° C. to 85° C. result when the future standard cross section of 0.35 mm² is implemented.

For the driver airbag ignition circuit $ZK_F$ including copper clock spring 7 having an ohmic resistance $R_{WF}$ of 0.6Ω at 20° C., an additional temperature tolerance of +152 mΩ/−140 mΩ in the vehicle temperature range of −40° C. to 85° C. results.

Since the lengths of the ignition circuit lines (go-line $L_{p1}$, $L_{pn}$, $L_{pF}$ and return line $L_{m1}$, $L_{mn}$, $L_{mF}$) are known, the resistance fluctuations induced by a temperature change may be compensated for. Measured value $R_{ZK(i)\_mess}$ is converted to compensated resistance value $R_{ZK(i)\_KA}$ using equation (A1).

$$R_{ZK(i)\_KA1}=R_{ZK(i)\_mess}-(R_{L(i)}(20° C.)\times(\vartheta_{L\_mess}-20° C.)\times\alpha) \quad (A1)$$

$R_{ZK(i)\_mess}$: measured value
$R_{ZK(i)\_KA1}$: compensated resistance value
$R_{L(i)}(20° C.)$: copper resistance of the ignition circuit line at 20° C.
$\vartheta_{L\_mess}$: temperature of the copper line in ° Celsius
$\alpha$: temperature coefficient of the copper resistance=+0.0039/° C.

If the ignition circuit line (go-and-return line) for ignition circuit (i) to be measured has an overall length l of 10 m and a cross section A of 0.35 mm², a line resistance $R_{L(i)}(20° C.)$ of 557 mΩ results. The airbag system controller may calculate correction term $((\vartheta_{L\_mess}-20° C.)\times\alpha)$ on the basis of temperature $\vartheta_I$ in the vehicle interior, which was detected for the particular measurement and which approximately corresponds to line temperature $\vartheta_{L\_mess}$. In the example, if $\vartheta_{L\_mess}=50°$ C., it therefore follows that 558 mΩ×30° C.×0.0039/° C.=65 mΩ.

As is further apparent from FIG. 1, in the first exemplary embodiment of control unit 10A according to the present invention, evaluation and control unit 20A reads in instantaneous temperature $\vartheta_I$ in the vehicle interior from an external temperature sensor 5 via communication interface 14. Due to the reading-in of vehicle interior temperature $\vartheta_I$, interior temperature $\vartheta_I$ is available as an influencing variable of the ignition circuit resistance measurement. Communication interface 14 may include, for example, a LIN, CAN, FlexRay and/or Ethernet connection.

In the first exemplary embodiment of control unit 10A according to the present invention, evaluation and control unit 20A sends a temporally limited measuring current between 20 mA and 100 mA through particular ignition circuit $ZK_1$, $ZK_n$ to be monitored and evaluates a differential voltage after signal processing, i.e., generally amplification, filtering, and offset compensation. Resultant measured value $R_{ZK(i)\_mess}$ is proportional to the total loop resistance of ignition circuit $ZK_1$, $ZK_n$, $ZK_F$. Due to the reading-in of vehicle internal temperature $\vartheta_I$, which essentially corresponds to line temperature $\vartheta_{L\_mess}$, via communication interface 14 close to the time for measured value detection $R_{ZK(i)\_mess}$, i.e., shortly before or shortly after the measured value detection, the temperature compensation of the ignition circuit lines according to equation (A1) is made possible. Nominal values $R_{L(i)}(20° C.)$ of the lines are stored, for example, in read-only data memory 17 of control unit 10A. Read-only memory 17 may be designed, for example, as an EEPROM, FLASH, etc.

The methodology may also be expanded to driver airbag ignition circuit $ZK_F$. This additionally includes clock spring 7. The temperature compensation is then carried out according to equation (A2):

$$R_{ZK(i)\_KA2}=R_{ZK(i)\_mess}-((R_{L(i)}(20° C.)+R_{WF}(20° C.))\times(\vartheta_{L\_mess}-20° C.)\times\alpha \quad (A2)$$

$R_{ZK(i)\_mess}$: measured value
$R_{ZK(i)\_KA2}$: compensated resistance value
$R_{L(i)}(20° C.)$: copper resistance of the ignition circuit line at 20° C.
$R_{WF}(20° C.)$: copper resistance of the clock spring at 20° C.
$\vartheta_{L\_mess}$: temperature of the copper line is ° Celsius
$\alpha$: temperature coefficient of the copper resistance=+0.0039/° C.

For driver airbag ignition circuit $ZK_F$, the summation resistance of the ignition circuit line (go-line $ZK_{pF}$ and return line $ZK_{mF}$) and clock spring 7 at 20° C. are stored in read-only memory 17.

A further important variable is the ohmic resistance of conductors $T_{p1}$, $T_{pn}$, $T_{pF}$, $T_{m1}$, $T_{mn}$, $T_{mF}$ (copper tracks), which are situated on a circuit board of control unit 10A, in the ignition circuit positive connection and the ignition circuit negative connection. The temperature dependence of these resistances may also be compensated for and therefore likewise increases the measuring accuracy or permits narrower conductor connections, while the accuracy remains the same. Control unit internal temperature $\vartheta i(UB)$ is ascertained for this purpose. Internal temperature $\vartheta i(UB)$ of the control unit may be inferred from power loss $P_{v\_SG}(UB)$ of all components and thermal resistance $R_{thSG\_i\_e}$ of a housing of control unit 10A. In particular, the knowledge of supply voltage $U_B$ is important for this purpose, since power loss $P_{v\_SG}(UB)$ in control unit 10A is a function of this voltage $U_B$. This function may be stored as a table in read-only memory 17 of control unit 10A or as a data set or, if housing thermal resistance $R_{thSG\_i\_e}$ is known, the function of temperature difference $d\vartheta_{i\_e}(SG)$ of the control unit interior relative to external space as a function of control unit supply voltage $U_B$ may be directly stored.

As mentioned above, evaluation and control unit 20A measures supply voltage $U_B$ via analog-digital converter 22 close to the time for detecting measured value $R_{ZK(i)\_mess}$, i.e., shortly before or shortly after the measured value detection and, with the aid of a table for particular control unit 10A stored in read-only memory 17, determines prevailing temperature difference $d\vartheta_{i\_e}(UB)$ relative to the control unit surroundings. Together with vehicle internal temperature $\vartheta_I$, which is already known, the compensation of the temperature effects of the copper on ignition circuit conductors $T_{p1}$, $T_{pn}$, $T_{pF}$, $T_{m1}$, $T_{mn}$, $T_{mF}$ in control unit 10A and on external ignition circuit lines $L_{p1}$, $L_{pn}$, $L_{pF}$, $L_{m1}$, $L_{mn}$, $L_{mF}$ to squib $ZP_1$, $ZP_n$, $ZP_F$ without copper clock spring 7 then takes place according to equation (B1) and, with copper clock spring 7, according to equation (B2).

$$R_{ZK(i)\_KB1}=R_{ZK(i)\_mess}-(R_{L(i)}(20°\,C.)\times(\vartheta_{L\_mess}-20°\,C.)\times\alpha)-(R_{T(i)}(20°\,C.)\times(d\vartheta_{i\_e}(UB)+\vartheta_{L\_mess}-20°\,C.)\times\alpha) \quad (B1)$$

$$R_{ZK(i)\_KB2}=R_{ZK(i)\_mess}-((R_{L(i)}(20°\,C.)+R_{WF}(20°\,C.))\times(\vartheta_{L\_mess}-20°\,C.)\times\alpha)\times(R_{T(i)}(20°\,C.)\times(d\vartheta_{i\_e}(UB)+\vartheta_{L\_mess}-20°\,C.)\times\alpha) \quad (B2)$$

$R_{ZK(i)\_mess}$: measured value
$R_{ZK(i)\_KB1}$: compensated resistance value
$R_{ZK(i)\_KB2}$: compensated resistance value
$R_{L(i)}(20°\,C.)$: copper resistance of the ignition circuit line at 20° C.
$R_{WF}(20°\,C.)$: copper resistance of the clock spring at 20° C.
$\vartheta_{L\_mess}$: temperature of the copper line in ° Celsius
$\alpha$: temperature coefficient of the copper resistance=+0.0039/° C.
$R_{T(i)}(20°\,C.)$ copper resistance of the ignition circuit conductors at 20° C.
$d\vartheta_{i\_e}(UB)$ temperature difference relative to the control unit surroundings As is further apparent from FIG. 2, in the second exemplary embodiment of control unit 10B according to the present invention, evaluation and control unit 20B may not read in instantaneous temperature $\vartheta_I$ in the vehicle interior from an external temperature sensor 5 via communication interface 14. This means a direct detection of vehicle interior temperature $\vartheta_I$ is not possible. In this case, evaluation and control unit 20B utilizes an integrated temperature sensor 24 which measures an internal temperature $\vartheta_{i\_mess}$ at an internal terminal ("Die") of evaluation and control unit 20B. System ASICs generally include such temperature sensors 24 for reasons of robustness. When a thermal resistance $R_{thJ\_A}$ between internal terminal ("Die") of evaluation and control unit 20B, which is designed as an ASIC, and the surroundings of evaluation and control unit 20B, and of power loss $P_{v\_ASIC}(UB)$ of evaluation and control unit 20B is known, evaluation and control unit 20B may infer, by measuring internal temperature $\vartheta_{i\_mess}$, control unit internal temperature $\vartheta_i(UB)$ according to equation (C1).

$$\vartheta_i(UB)=\vartheta_{i\_mess}+(P_{v\_ASIC}(UB)\times R_{thJ\_A}) \quad (C1)$$

e.g., $R_{thJ\_A}$=16K/W (for a 128-pin TQFPepad package)

Since the power loss of evaluation and control unit 20B is generally a function of supply voltage $U_B$, term $(P_{v\_ASIC}(UB)\times R_{thJ\_A})$ may be stored as a table in read-only memory 17 of control unit 10B in an application-specific way. If control unit internal temperature $\vartheta_i(UB)$ has been ascertained, prevailing ambient temperature $\vartheta_e$ may be determined via equation (C2) if power loss $P_{v\_SG}(UB)$ of all components in the interior of control unit 10B is known. This approximately corresponds to vehicle internal temperature $\vartheta_I$ or may be converted thereto. Vehicle internal temperature $\vartheta_I$ therefore corresponds to line temperature $\vartheta_L$. Thermal resistance $R_{thSG\_i\_e}$ of the control unit internal air temperature relative to the external air temperature for the selected housing of control unit 10B is required for this purpose. Power loss $P_{v\_SG}(UB)$ of the control unit is likewise a function of supply voltage $U_B$ of the control unit. Therefore, term $(P_{v\_SG}(UB)\times R_{thSG\_i\_e})$ may likewise be stored as a data set in read-only memory 17 of control unit 10B.

$$\vartheta_e \approx \vartheta_i \approx \vartheta_L \approx \vartheta_i(UB)+(P_{v\_SG}(UB))\times R_{thSG\_i\_e}) \quad (C2)$$

For the particular measured value detection $R_{ZK(i)\_mess}$ of an ignition circuit resistance, control unit internal temperature $\vartheta_i(UB)$ is determined according to equation (C1) with the aid of data sets for term $(P_{v\_ASIC}(UB)\times R_{thJ\_A})$ stored in read-only memory 17 and, additionally, the ambient temperature of control unit 10B is determined via equation (C2) with the aid of the data sets for term $(P_{v\_SG}(UB)\times R_{thSG\_i\_e})$ stored in read-only memory 17. Therefore, the influence of the temperature on all copper connections in ignition circuits $ZK_1$, $ZK_n$ without clock spring 7 may be compensated for according to equation (D1) and in vehicle airbag ignition circuit $ZK_F$ with clock spring 7 according to equation (D2).

$$R_{ZK(i)\_KD}=R_{ZK(i)\_mess}-(R_{L(i)}(20°\,C.)\times(\vartheta_L-20°\,C.)\times\alpha)-(R_{T(i)}(20°\,C.)\times(\vartheta_i(UB)\times\alpha) \quad (D1)$$

$$R_{ZK(i)\_KD}=R_{ZK(i)\_mess}-((R_{L(i)}(20°\,C.)+R_{WF}(20°\,C.))\times(\vartheta_L-20°\,C.)\times\alpha)-(R_{T(i)}(20°\,C.)\times(\vartheta_i(UB)\times\alpha) \quad (D2)$$

The copper resistances may also be completely removed from loop resistance $R_{ZK(i)\_mess}$ for any temperature. As a result, the measured value is concentrated only on the important contact resistances and the squib resistance. Other upper and lower limiting values are required therefor by the automobile manufacturers, however. A new upper limiting value $GN_O$ may be predefined, for example, with 4Ω and a new lower limiting value $GN_U$ may be predefined, for example, with 1.2Ω. These would be uniform for every ignition circuit, however.

By using vehicle internal temperature sensor 5 and applying equation (D2), the following equation (E1) applies:

$$R_{ZK(i)\_KE1}=R_{ZK(i)\_mess}-R_{L(i)}(20°\,C.)-((R_{L(i)}(20°\,C.)+R_{WF}(20°\,C.))\times(\vartheta_{L\_mess}-20°\,C.)\times\alpha)-R_{T(i)}(20°\,C.)-((R_{T(i)}(20°\,C.)\times(\vartheta_i(UB)\times\alpha) \quad (E1)$$

By using internal temperature sensor 24 and applying equation (D2), the following equation (E2) applies:

$$R_{ZK(i)\_KE2} = R_{ZK(i)\_mess} - R_{L(i)}(20°\ C.) - ((R_{L(i)}(20°\ C.) + R_{WF}(20°)) \times (\vartheta_L - 20°\ C.) \times \alpha) - R_{T(i)}(20°\ C.) - ((R_{T(i)}(20°\ C.) \times (\vartheta_i(UB) \times \alpha)$$ (E2)

In this case, copper resistance $R_{WF}(20°\ C.)$ is set to the value "0" for ignition circuits $ZK_1$, $Z_n$ without clock spring 7.

In the exemplary embodiments described, "copper" was used as the material for the supply lines and the conductors. The embodiments also apply in a similar way for other suitable materials, such as, for example, aluminum or silver, using adapted, material-specific parameters.

Specific embodiments of the present invention provide control units for a restraint system in a vehicle, which, due to the determination or utilization of the interior temperature of the vehicle and, optionally, the internal temperature of the control unit, compensate for the massive influence of the temperature on the important copper resistance of the supply lines to the squibs. Due to the specific embodiments of the control units according to the present invention, it is possible to utilize smaller copper core cross sections in the ignition circuit without sacrificing monitoring accuracy and expansion of the limiting values.

What is claimed is:

1. A device comprising:
a control unit; and
an interface connectable, via a go-line and a return line that are external to the device, to a squib of an external ignition circuit for activating a restraint system of a vehicle;
wherein the control unit is configured to:
cyclically perform the following:
perform a measurement to ascertain an instantaneous ohmic loop resistance of the ignition circuit;
determine an instantaneous temperature in an interior of the vehicle close to the time of the measurement;
based on the determined instantaneous temperature of the interior of the vehicle, carry out a temperature compensation of the ascertained instantaneous ohmic loop resistance for the go-line and the return line of the ignition circuit based on which a modified value of the instantaneous ohmic loop resistance is obtained; and
compare the modified value of the instantaneous ohmic loop resistance to at least one stored threshold value; and
control the squib based on a result of the comparisons.

2. The device as recited in claim 1, wherein the control unit is configured to perform the determination of the instantaneous temperature in the interior of the vehicle is by reading in the instantaneous temperature in the interior of the vehicle from a temperature sensor via a communication interface.

3. The device as recited in claim 1, further comprising:
a first conductor connecting the control unit to the interface and via which the control unit is connectable to the go-line; and
a second conductor connecting the control unit to the interface and via which the control unit is connectable to the return line, wherein:
the control unit is configured to:
determine an instantaneous internal temperature in the device; and
based on the determined instantaneous internal temperature in the device, carry out a temperature compensation of the ascertained instantaneous ohmic loop resistance for the first and second conductors;
the modified value is further based on the temperature compensation carried out for the first and second conductors.

4. The device as recited in claim 1, wherein the control unit is configured to detect an instantaneous supply voltage via an analog-digital converter.

5. The device as recited in claim 4, wherein, on the basis of the instantaneous supply voltage, the control unit is configured to determine power losses of components situated within a housing of the device.

6. The device as recited in claim 3, wherein the control unit is configured to:
detect an instantaneous supply voltage via an analog-digital converter;
based on the detected instantaneous supply voltage, ascertain power losses of components situated within a housing of the device; and
calculate the instantaneous internal temperature in the device on the basis of the instantaneous temperature in the vehicle interior, the ascertained power losses, and a thermal resistance of the housing of the device.

7. The device as recited in claim 6, further comprising a temperature sensor that is situated within the control unit and is configured to detect a temperature of an internal contact within the control unit, wherein the control unit is configured to calculate the instantaneous internal temperature in the device based on the detected temperature of the internal contact.

8. The device as recited in claim 7, wherein the control unit is configured to calculate the instantaneous internal temperature in the device based additionally on power loss of the control unit and a thermal resistance between the internal contact within the control unit and an interior of the device.

9. The device as recited in claim 8, wherein the determination of the instantaneous temperature in the interior of the vehicle is by a calculation by the control unit that is based on the instantaneous internal temperature in the device, and the ascertained power losses of components situated within the housing of the device, and a thermal resistance of the housing of the device.

10. The device as recited in claim 1, further comprising a read-only memory storing at least one of parameters, parameter curves, and parameter tables on the basis of which the control unit is configured to carry out the temperature compensation.

* * * * *